(12) United States Patent
Kallidis et al.

(10) Patent No.: US 10,150,443 B2
(45) Date of Patent: Dec. 11, 2018

(54) AIRBAG MODULE ARRANGEMENT FOR A VEHICLE AND VEHICLE WITH THE AIRBAG MODULE ARRANGEMENT

(71) Applicant: GM GLOBAL TECHNOLOGY OPERATIONS LLC, Detroit, MI (US)

(72) Inventors: Kyriakos Kallidis, Ruesselsheim (DE); Carsten Glaser, Ruesselsheim (DE); Michael Polster, Ruesselsheim (DE); Thomas Roemer, Ruesselsheim (DE); Thorsten Best, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 15/383,847

(22) Filed: Dec. 19, 2016

(65) Prior Publication Data

US 2017/0174175 A1    Jun. 22, 2017

(30) Foreign Application Priority Data

Dec. 19, 2015  (DE) .................. 10 2015 016 515

(51) Int. Cl.
*B60R 21/2334* (2011.01)
*B60R 21/213* (2011.01)
*B60R 21/231* (2011.01)
*B60R 21/232* (2011.01)
*B60R 21/16* (2006.01)

(52) U.S. Cl.
CPC ........ *B60R 21/2334* (2013.01); *B60R 21/213* (2013.01); *B60R 21/232* (2013.01); *B60R 21/23138* (2013.01); *B60R 2021/161* (2013.01)

(58) Field of Classification Search
CPC .............. B60R 21/2334; B60R 21/213; B60R 21/23138; B60R 21/232; B60R 2021/161
See application file for complete search history.

(56) References Cited

U.S. PATENT DOCUMENTS

| 5,167,427 | A | 12/1992 | Baba |
| 5,186,517 | A | 2/1993 | Gilmore et al. |
| 5,540,459 | A * | 7/1996 | Daniel .................. B60R 21/213 280/730.2 |
| 6,485,049 | B1 * | 11/2002 | Prottengeier ....... B60R 13/0206 280/730.2 |
| 6,893,042 | B1 * | 5/2005 | Ponceau ............... B60R 21/213 280/730.2 |
| 6,974,152 | B2 * | 12/2005 | Hanjono ................. B60R 21/04 280/728.3 |
| 7,188,863 | B2 | 3/2007 | Tiesler et al. |

(Continued)

FOREIGN PATENT DOCUMENTS

| DE | 10322691 A1 | 8/2004 |
| DE | 102005049574 A1 | 4/2007 |
| DE | 102006061620 A1 | 7/2008 |

*Primary Examiner* — Darlene P Condra
(74) *Attorney, Agent, or Firm* — Lorenz & Kopf, LLP

(57) ABSTRACT

Airbag module arrangement for a car is disclosed having an airbag module including an inflatable airbag to protect of at least one occupant of the car, a body section of the vehicle having a fixing point to attach the airbag module. The airbag module arrangement includes a fastening element attached in the fixing point on the body section. An airbag ramp in the direction of steering of the anti-inflatable airbags with an airbag ramp connection attached to the body section which is screwless.

15 Claims, 2 Drawing Sheets

(56) References Cited

U.S. PATENT DOCUMENTS

| | | |
|---|---|---|
| 7,356,886 B2 | 4/2008 | Okada |
| 7,578,521 B2 * | 8/2009 | Downey ............... B60R 13/025 |
| | | 280/730.2 |
| 8,136,833 B2 | 3/2012 | Baumgartner |
| 8,303,010 B2 * | 11/2012 | She ....................... B60R 13/025 |
| | | 296/1.08 |
| 9,248,800 B1 * | 2/2016 | Moore .................. B60R 21/213 |
| 9,586,554 B1 * | 3/2017 | Baer ..................... B60R 21/213 |
| 2006/0186645 A1 | 8/2006 | Kulbach |
| 2008/0007034 A1 | 1/2008 | Downey et al. |

* cited by examiner

AIRBAG MODULE ARRANGEMENT FOR A VEHICLE AND VEHICLE WITH THE AIRBAG MODULE ARRANGEMENT

CROSS-REFERENCE TO RELATED APPLICATION

This application claims priority to German Patent Application No. 102015016515.1, filed Dec. 19, 2015, which is incorporated herein by reference in its entirety.

TECHNICAL FIELD

The invention relates to an airbag module arrangement for a vehicle and to a vehicle with the airbag module arrangement.

BACKGROUND

Today, airbag modules are integrated in most vehicles which are fastened to a vehicle body on the vehicle inside. Often, the airbag modules are fastened to the vehicle body via a fastening clip.

For example, the publication WO 2010/003946 A1 describes a gas bag arrangement for a vehicle occupant restraint system. The gas bag arrangement comprises an inflatable gas bag, a fastening element for fastening the gas bag to a holding structure and means for counteracting a twisting of the fastening element preassembled on the gas bag.

SUMMARY

The invention provides a functionally improved airbag module arrangement for a vehicle.

Proposed is an airbag module arrangement for a vehicle, for example for a passenger car. The airbag module arrangement comprises an airbag module with an inflatable airbag, which is designed for protecting at least one occupant of the vehicle. For example, the airbag is designed as a side airbag, in particular as a curtain airbag and/or as a so-called RRAB. In particular, the inflated airbag protects the at least one occupant of the vehicle during and/or after an impact, in particular lateral impact, of the vehicle against injuries. Specifically, the airbag in the inflated state extends over a side window front of the vehicle in order to intercept an impact of the at least one occupant on the side window front.

The airbag module arrangement comprises a body section of the vehicle. In the body section, a fastening point is arranged which is designed for fastening the airbag module to the body section. For example, the body section is arranged on a side wall, on a roof rail or on a vehicle roof of the vehicle and/or it forms a section of the side wall, of the roof rail or of the vehicle roof. Preferably, the body section is designed as a section of a B-pillar and/or of a C-pillar of the vehicle.

The airbag module arrangement comprises a fastening element via which the airbag is fastened in the fastening point to the body section.

The airbag module arrangement comprises an airbag ramp. The airbag ramp is designed for the directional steering of the airbag being inflated. Preferably, the airbag ramp is designed as a metal component, as a plastic component or as a component made from a combined material, such as for example a fiber-reinforced plastic.

The airbag ramp is fastened to the body section free of any screw connection. The fastening of components of an airbag module arrangement, such as for example of an airbag module or an airbag ramp via screw connections is often difficult and involved during the assembly in the vehicle since screw connection points are difficult to access for a worker. For this reason, a connection device other than a screw connection is utilized within the scope of the invention.

It is preferred that the airbag ramp comprises a reaction surface for the airbag being inflated. Preferentially, the reaction surface stands away from the body section at an angle. For example, the reaction surface is arranged at an angle of at least 30 degrees, preferentially of at least 45 degrees, in particular of at least 70 degrees and/or of maximally 110 degrees relative to the body section. In particular, the airbag being inflated contacts the reaction surface and/or supports itself thereon, so that it can be steered in a direction in which it can ensure the most effective protection for the at least one occupant. In particular, the airbag being inflated is steered away from a trim fixture of the body section, so that because of this damaging of the trim fixture by the airbag being inflated can be avoided. Because of this, costs for a replacement and installation of the trim fixture can be saved after a lateral impact of the vehicle and following the inflating of the airbag.

In a preferred embodiment of the invention, the airbag ramp is fastened in the fastening point. Preferentially, the airbag ramp is fastened in the same fastening point as the airbag module. In particular, the airbag ramp is fastened in the fastening point jointly with the airbag module. Advantageous in this is that no separate fastening point for the airbag ramp has to be provided on the body section. Because of this, costs and effort during the production of the airbag module arrangement can be reduced.

A preferred implementation of the invention provides that the airbag ramp is fastened in the fastening point via the fastening element. Preferably, the airbag ramp is fastened in the fastening point with the same fastening element as the airbag module. In particular, the airbag ramp is fastened jointly with the airbag module by the same fastening element in the same fastening point. Advantageous in this is that no separate fastening element for the airbag ramp is needed. Because of this, the component number can be reduced and costs saved.

In summary, the fastening point and the fastening element have a dual function for fastening the airbag module and the airbag ramp, which in turn can reduce effort and costs during the production of the airbag module arrangement.

It is possible, within the scope of the invention that the airbag ramp is preassembled on the airbag module for example via the fastening element and can be fastened in the fastening point of the body section jointly with the airbag module via the fastening element. Because of this, the assembly of the airbag module arrangement in the vehicle can be simplified and assembly time saved.

In a preferred design implementation of the invention, the fastening point is arranged above the reaction surface of the airbag ramp. For example, the airbag ramp for this purpose comprises at least one contact surface with which the airbag ramp lies against the body section and/or contacts the same. Preferentially, a recess is introduced into the contact surface which is arranged congruent with the fastening point through which the fastening element is passed for fastening the airbag ramp.

In a preferred design implementation of the invention, the airbag ramp comprises a support surface with which it supports itself on the body section preferentially below the fastening point, in particular below the reaction surface. Because of this, a stability of the airbag ramp and its direction-steering effect on the airbag being inflated can be ensured in particular during and/or after the impact of the vehicle.

A preferred configuration of the invention provides that the fastening element comprises an airbag clip with a holding clamp for holding the airbag module. In particular, the holding clamp surrounds the airbag module so that the airbag clip is connected to the airbag module and can be fastened with the same in the fastening point. Optionally, the airbag clip that is connected to the airbag module is passed through the recess in the contact surface of the airbag ramp in an assembly direction and inserted into the body section in the fastening point in assembly direction. Preferentially, the airbag clip, for example by latching and/or spreading open of at least one restraint arm of the airbag clip at a back side of the body section forms a fastening of the airbag module and of the airbag ramp which is secured in a form-fit manner that is directed against the assembly direction. Because of this, a screw connection for fastening the airbag module and the airbag ramp which is often difficult to access and because of this elaborate to carry out can be omitted.

In a preferred embodiment of the invention, the airbag module arrangement comprises an anti-twisting device for protecting the airbag ramp against twisting, in particular during and/or after the impact of the vehicle. Preferentially, the anti-twisting device comprises a first bead in the body section. In particular, the anti-twisting device comprises a second bead which is arranged in the airbag ramp. For example, the second bead is arranged in the contact surface of the airbag ramp. It is particularly preferred that the second bead corresponds with the first bead. In particular, the second bead in the fastened state of the airbag ramp engages into a first bead in a form-fit manner and thereby prevents a twisting of the airbag ramp, in particular when loaded by the airbag being inflated. The production of the anti-twisting device as the first and second bead can be realized cost-effectively.

Alternatively or optionally complementarily, the anti-twisting device comprises a connection interface and a connection mating interface for connecting the airbag ramp to the body section. In particular, the connection interface and the connection mating interface are connected to one another in a rotationally fixed manner by way of a connection element, for example by a screw or a rivet. Preferentially, the connection interface and the connection mating interface are arranged in the airbag ramp in particular in the contact surface of the airbag ramp and in the body section respectively.

The anti-twisting device prevents twisting of the airbag ramp, in particular during and/or after an impact of the vehicle. Because of this, it can be advantageously ensured that the reaction surface of the airbag ramp is correctly positioned and because of this steers the airbag being inflated in the correct direction. In particular, the at least one occupant can be effectively protected against injuries and the covering part saved from damage.

BRIEF DESCRIPTION OF THE DRAWINGS

Further features, advantages and effects of the invention are obtained from the following description of preferred exemplary embodiments of the invention. There it shows.

DETAILED DESCRIPTION

Figure 1:
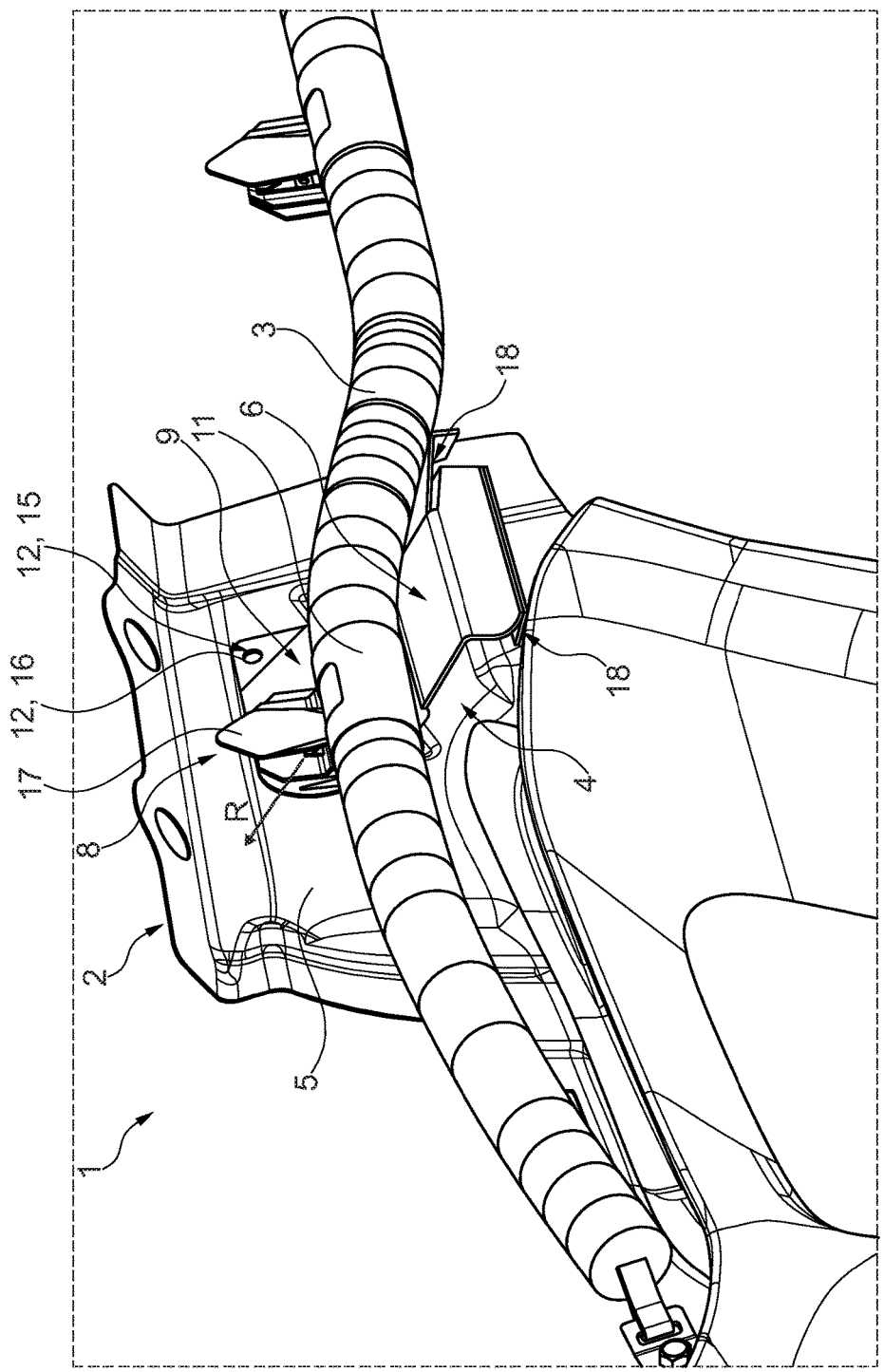
FIG. 1 is an airbag module arrangement with an airbag module and an airbag ramp, which are jointly fastened to a body section of a vehicle in a fastening point.

Parts which correspond to one another or same parts are in each case provided with the same reference characters in the figures.

Figure 2:
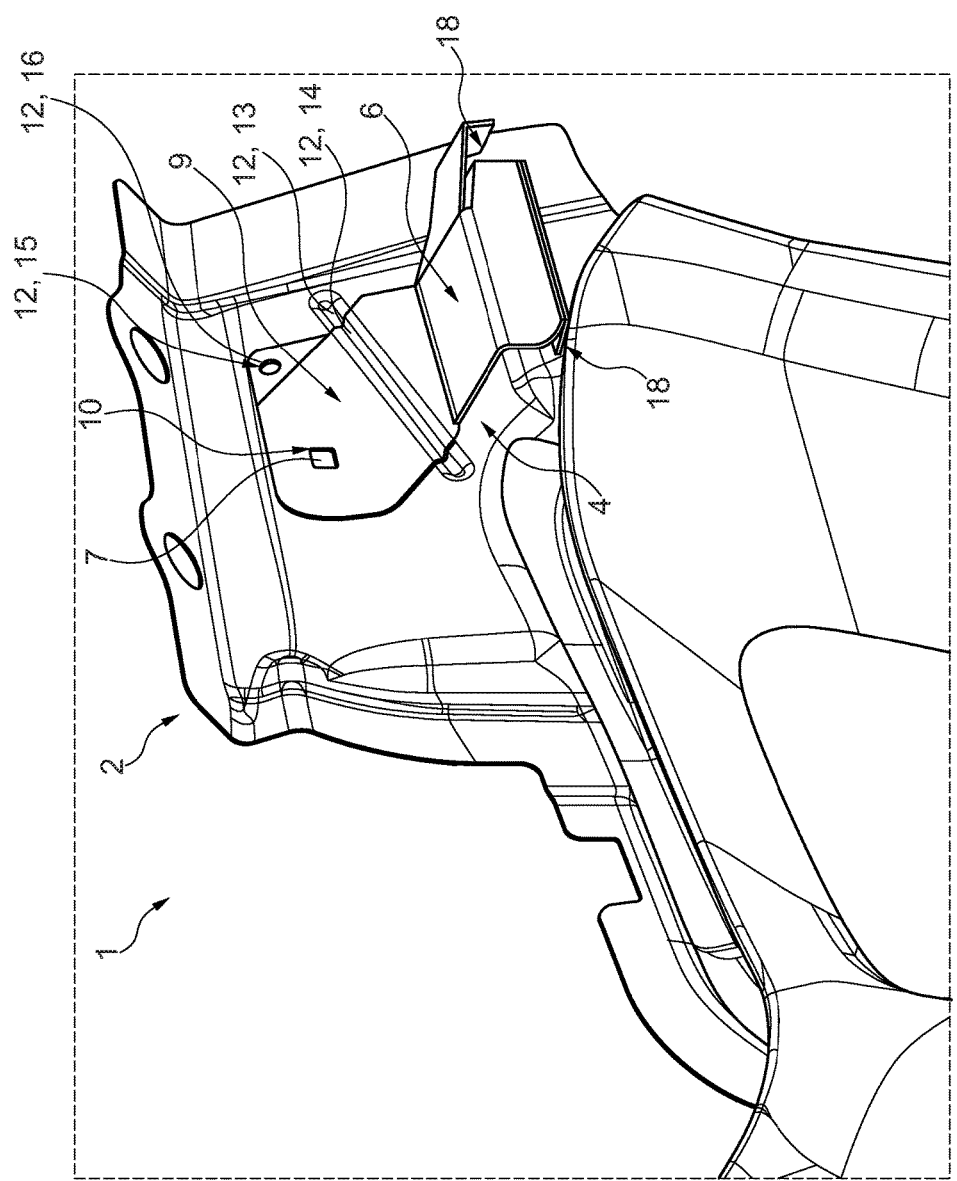
FIG. 2 the airbag module arrangement from FIG. 1 is shown without the airbag module.

FIG. 1 shows an airbag module arrangement 1 for a vehicle with a body section 2 of the vehicle, with an airbag module 3 and with an airbag ramp 4. FIG. 2 shows the airbag module arrangement 1 without the airbag module 3, as a result of which the airbag ramp 4 can be seen completely.

The airbag module 3 comprises an inflatable airbag which is not shown, which during and/or after an impact, in particular during a side impact of the vehicle, unfurls along a side window front of the vehicle and thereby can protect at least one occupant of the vehicle from injuries. The airbag is designed as a so-called curtain airbag and/or RRAB.

The body section 2 is formed as a section of a vehicle pillar, in particular as a section of a B or C-pillar of the vehicle. The body section 2 is covered with a trim fixture 5.

The body section 2 comprises a fastening point 7 (FIG. 2), in which the airbag module 3 is fastened. The fastening point 7 is formed as a whole in the body section 2. A fastening element 8 of the airbag module arrangement 1 is passed through the fastening point 7. The fastening point 8, which is formed as a clip, in particular as an airbag clip for securing the airbag module 3 on the body section 2 in a form-fit manner. The airbag clip 17 comprises a holding clamp 11, which surrounds the airbag module so that the airbag clip 17 is connected to the airbag module 3.

The airbag ramp 4 is formed as a metal or plastic part or as a fiber composite component and serves to steer the airbag being inflated in a direction in which the airbag can most effectively protect the at least one occupant from injuries. Furthermore, the airbag ramp 4 serves in order to steer the airbag being inflated away from the trim fixture 5 of the body section 2 thus avoiding damage to the trim fixture 5.

For steering the airbag, the airbag ramp 4 comprises a reaction surface 6 which is arranged at an angle for example at an angle of at least 30 degrees, preferentially of at least 45 degrees, in particular of at least 70 degrees and/or of maximally 110 degrees relative to the body section 2. The fastening point 7 is arranged above the reaction surface 6.

The airbag ramp 4 comprises a contact surface 9 which lies against the body section 2, in particular against the trim fixture 5 and/or contacts the same. In the contact surface 9, a recess 10 is introduced which is designed for passing through the airbag clip 17.

The airbag ramp 4 is fastened to the body section 2 in a screw connection-free manner. In the contact surface 9 of the airbag ramp 4, a recess 10 is introduced. The recess 10 is arranged congruent with the fastening point 7. The airbag clip 17 is introduced in an assembly direction R through the recess 10 and through the hole forming the fastening point 7 into the body section 2. Because of this, the airbag ramp 4 is fastened to the body section jointly with the airbag module 3 in the fastening point 7 by the airbag clip 17.

By independently engaging at a back side of the body section 2 or by engaging behind the body section 2, the airbag clip 17 simultaneously secures the airbag ramp 4 and the airbag module 3 in a form-fit manner against detaching from the body section 2 against the assembly direction R. It is possible that the airbag ramp 4 is initially preassembled on the airbag module 3, in particular via the airbag clip 17, and is subsequently fastened to the body section 2 jointly as a component complex.

The airbag ramp 4 comprises an anti-twisting device 12, which secures the airbag ramp 4 against twisting, in particular during and/or after the impact of the vehicle. The anti-twisting device 12 comprises a first bead 13 (FIG. 2), which is arranged in the body section 2 and/or in the trim fixture 5. The anti-twisting device 12 comprises a second bead 14 (FIG. 2), which is introduced into the airbag ramp 4, in particular in the contact surface 9 of the same. The second bead 14 corresponds to the first bead 13 and engages in the same in a form-fit manner.

The anti-twisting device 12 also comprises a connection interface 15 and a connection mating interface 16. The connection interface 15 is introduced as a whole in the airbag ramp 4, in particular in the contact surface 9. The connection mating interface 16 is designed as a whole in the body section 2 and in the trim fixture 5. By way of a connection element of the anti-twisting device 12 which is not shown, the airbag ramp 4 is fastened in the interfaces 15, 16 in a rotationally fixed manner. The connection element can for example be formed as a screw or as a rivet.

The airbag ramp 4 comprises a support surface 18, with which the airbag ramp 4 supports itself on the body section 2, in particular on the trim fixture 5. The support surface 18 is arranged below the fastening point 7 and below the reaction surface 6. By way of the support surface 18, a stability of the airbag ramp 4 is increased, in particular when the airbag is being inflated and supports itself on the reaction surface 6.

While at least one exemplary embodiment was disclosed in detail above it must be recognized that a plurality of variations according to the invention do exist. It must likewise be recognized that the at least one exemplary embodiment only has an exemplary character and does not constitute any limitation of the scope of protection, of the areas of application or of the configuration. The present disclosure is rather intended to be a pleasant schedule for implementing at least one exemplary embodiment. Accordingly, it should also be recognized that various variations of the function or the arrangement of the elements of the at least one exemplary embodiment can be realized without leaving the scope as given by the claims and their legal equivalents.

The invention claimed is:

1. An airbag module arrangement for a vehicle comprising:
    an inflatable airbag for protecting at least one occupant of the vehicle;
    a fastening module configured to fasten the airbag module to a fastening point on a body section of the vehicle with a fastening element; and
    an airbag ramp for directional steering of the inflatable airbag during inflation;
    an anti-twisting element for the airbag ramp, the anti-twisting element including a first bead arranged in the body section and a second bead arranged in the airbag ramp;
    wherein the airbag ramp is configured to fasten to the body section with a screwless connection such that the first and second beads engage into one another in a form-fit manner and prevent twisting of the airbag ramp.

2. The airbag module arrangement according to claim 1, wherein the airbag ramp is fastened in the fastening point.

3. The airbag module arrangement according to claim 2, wherein the airbag ramp is fastened in the fastening point via the fastening element.

4. The airbag module arrangement to claim 1, wherein the airbag ramp is preassembled on the airbag module and can be fastened in the fastening point of the body section jointly with the airbag module.

5. The airbag module arrangement according to claim 1, wherein the airbag ramp comprises a reaction surface for directional steering the airbag during inflation, wherein the reaction surface projects from the body section at an angle and the fastening point is arranged above the reaction surface.

6. The airbag module arrangement according to claim 1, wherein the airbag ramp comprises at least one support surface with which the airbag ramp supports itself on the body section.

7. The airbag module arrangement according to claim 6, wherein the at least one support surface is arranged below at least one of the fastening point and the reaction surface.

8. The airbag module arrangement according to claim 1, wherein the fastening element comprises an airbag clip, wherein the airbag clip fastens the airbag module and the airbag ramp on the body section against an assembly direction in a form-fit manner.

9. The airbag module arrangement according to claim 1, wherein the anti-twisting device further comprises a connection interface arranged in the airbag ramp and a connection mating interface arranged in the body section and a connection element passing through the connection interface and the connection mating interface, wherein the airbag ramp and the body section are connected to one another in a rotationally fixed manner.

10. The airbag module arrangement according to claim 1, wherein the anti-twisting device is arranged above a reaction surface of the airbag ramp.

11. The airbag module arrangement according to claim 1, wherein the airbag ramp comprises one of a metal component, a plastic component or a fiber composite component.

12. The airbag module arrangement claim 1, wherein the airbag comprises a side airbag.

13. The airbag module arrangement claim 12, wherein the side airbag is selected from the group consisting of a curtain airbag or a roof rail air bag.

14. A vehicle comprising:
    a body section having a fastening point;
    an airbag module arrangement including an inflatable airbag, a fastening module configured to fasten the airbag module to the fastening point with a fastening element, an airbag ramp for directional steering of the inflatable airbag during inflation, and an anti-twisting element for the airbag ramp, the anti-twisting element including a first bead arranged in the body section and a second bead arranged in the airbag ramp;
    wherein the airbag ramp is configured to fasten to the body section with a screwless connection such that the first and second beads engage into one another in a form-fit manner and prevent twisting of the airbag ramp.

15. The vehicle according to claim 14, wherein the body section comprises a portion of a vehicle pillar.

* * * * *